United States Patent
Kim et al.

(10) Patent No.: US 6,271,959 B1
(45) Date of Patent: Aug. 7, 2001

(54) METHOD AND APPARATUS FOR OPTICAL FREQUENCY DEMODULATION OF AN OPTICAL SIGNAL USING INTERFEROMETRY

(75) Inventors: Kihong Kim, Kanata; Bruce Richardson, Nepean, both of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/338,530

(22) Filed: Jun. 23, 1999

(30) Foreign Application Priority Data

Jun. 23, 1998 (GB) .................................................. 9813412

(51) Int. Cl.[7] ....................................................... G02F 2/00
(52) U.S. Cl. ............................................ 359/325; 356/477
(58) Field of Search .............................. 359/325; 356/460, 356/477, 484

(56) References Cited

U.S. PATENT DOCUMENTS 4,632,552 * 12/1986 Olsson et al. ..................... 359/325 X
5,313,266 * 5/1994 Keolian et al. ....................... 356/477
6,154,308 * 11/2000 Hall ....................................... 359/325

FOREIGN PATENT DOCUMENTS 0595140   5/1994  (EP) .
2256761  12/1992  (GB) .
2257319   1/1993  (GB) .

* cited by examiner

Primary Examiner—John D. Lee

(57) ABSTRACT

The present invention provides an improved optical frequency demodulation technique for extracting overhead information from an optical channel signal carrying both high bit rate payload and low rate overhead data. The invention makes use of asymmetrical Mach-Zehnder interferometry (AMZI) in an optical frequency demodulator to efficiently extract the overhead information from the optical channel signal by frequency discrimination without necessitating a complete demodulation of the optical channel signal. By comparison to existing demodulation schemes, the invention provides an all-optical low cost, high gain technique for recovering the overhead data which improves the payload signal-to-noise ratio and enhance performance.

52 Claims, 7 Drawing Sheets

METHOD AND APPARATUS FOR OPTICAL FREQUENCY DEMODULATION OF AN OPTICAL SIGNAL USING INTERFEROMETRY

FIELD OF THE INVENTION

The present invention relates to signal demodulation in optical communication networks and more particularly to the demodulation of an optical signal by interferometry.

BACKGROUND OF THE INVENTION

In a typical fiber optic transmission network, information is conveyed in the form of optical channel signals generated by light sources such as lasers or light-emitting diodes. In order to transmit the information optically in a network, a payload signal is used to modulate the source input current of a particular light source so as to impress the optical output of that source with the content of the information to be transmitted. For example, digital information can be transposed onto an optical channel signal by modulating the associated source current between two fixed amplitude levels such that the light source produces an ON-OFF keyed (OOK) optical output operating at two distinct optical intensity levels. These different intensities in the optical output can then be used for representing binary data according to the form of encoding used.

In order to monitor the transmission of information, it is well known to administrate and maintain the optical channels by using a small portion of the available channel bandwidth in the fiber to transmit a low frequency, low amplitude overhead signal. This overhead signal is typically superimposed onto the payload information signal (hereinafter referred to as the payload signal) before the latter is applied to modulate a light source. As a result of the modulation, the light source produces an optical channel signal carrying both the payload and overhead information for transmission in a particular optical channel.

In current systems, the overhead modulation is carried out at a fixed modulation depth which is typically 5% to 10% of the payload signal amplitude. As an example, for a 20 mA payload signal the overhead signal may be set to ±0.5 mA (1 mA peak-to-peak) for a modulation depth of 5%. This high level of modulation depth is required to ensure proper demodulation and recovery of the overhead information at a suitable signal-to-noise ratio (SNR). However, the presence of an overhead signal modulated with a high modulation depth reduces the signal-to-noise ratio (SNR) of the payload signal and results in a substantial degradation of the system's performance. For systems which necessitate the transmission of overhead information, it would be desirable to transmit overhead signals at a lower modulation depth for improving payload SNRs and minimize the performance penalty.

In addition to the need to reduce the modulation depth at which overhead signals are modulated, it would also be desirable to have available a larger overhead bandwidth for transmitting more overhead information to improve management and control flexibility. Currently however, this need cannot be effectively addressed without resulting in a substantial penalty in performance. A larger overhead bandwidth will interfere more with the payload signal content, particularly in systems such as wavelength division multiplexed (WDM) networks for example, in which the payload signal necessitates a large bandwidth to accommodate multiple payload signals operating at different bit rates. With a larger bandwidth, the payload signal may overlap with an overhead signal, more particularly in the low frequency range where the frequency content of the overhead signal is typically located. This would cause a degradation of the payload signal SNR and seriously affect the system's performance. Therefore, it is also desirable to have an overhead signal which can carry additional information without seriously impeding the system's performance.

Presently, in order to retrieve an overhead signal from an optical channel signal, the optical channel signal must first be demodulated and converted into an electric form before any manipulation of the overhead information can be carried out. The optoelectrical conversion and demodulation of the entire optical channel signal can become quite expensive, particularly in transit terminals where only the overhead information is required for control and management. As optical technology evolves toward all optical networking, there will be a need to monitor optical signals at various points for fault detection and performance monitoring applications. A low cost, high SNR gain technique for recovering the overhead information without having to do a complete optical channel demodulation (payload and overhead) would also be desirable in the control of such networks.

SUMMARY OF THE INVENTION

The present invention addresses these issues and to this end provides a methodology and apparatus to mitigate the present limitations in this art.

The present invention provides a novel optical frequency demodulation technique for extracting overhead information from an optical channel signal carrying both payload and overhead information. The present invention makes use of interferometry in an optical frequency demodulator to efficiently extract the overhead information from the optical channel signal without complete signal demodulation.

In a preferred embodiment, the optical frequency demodulator is comprised of a tuned asymmetrical Mach-Zehnder interferometer (AMZI) for extracting the overhead information by frequency discrimination, a balanced detector pair for converting the overhead information extracted into an electrical signal and a low pass filter for eliminating high frequency components from the recovered overhead information signal.

The AMZI is designed to receive a suitable amount of optical channel signal power and operates to frequency discriminate from it the overhead information. In order to do this, the tuned AMZI operates to introduce ripples of a high frequency into the unwanted payload FM output signal component present in the optical channel signal such that the interference caused by the payload component can be subsequently eliminated in the low pass filter and the overhead information retrieved.

The optical frequency demodulating method and apparatus of the present invention can preferably be used to extract any overhead signal transmitted at frequencies where thermal chirp is induced. The overhead extraction can be made from any optical signal exhibiting large payload induced frequency variations which spread over a plurality of AMZI interference ripples. In a preferred embodiment of the invention, the overhead extraction can also be made in connection with payload signals which do not introduce any frequency variations in the optical signal. The overhead and payload signals can be of a wide range of frequencies but are typically respectively of a low frequency nature and a high frequency nature. Without loss of generality, these signals are hereinafter referred to as low frequency overhead signals and high frequency payload signals.

Preferably, the AMZI tuning is carried out with a feedback loop located between the AMZI and the low pass filter.

For optimal overhead recovery, the feedback loop also operates to compensate for ambiant temperature variations which may occur within the optical frequency demodulator.

Advantageously, the use of thermal characteristics of conventional laser sources provides an efficient amplitude modulation (AM) to frequency modulation (FM) conversion of the overhead information. With this higher AM to FM conversion efficiency, overhead information may be modulated at a lower modulation depth to improve the payload signal-to-noise ratio (SNR) and enhance performance.

Another advantage of the present invention is that the use of an AMZI provides a high slope for FM discrimination of the overhead information. The AMZI also advantageously exhibits a wavelength to photo-current response formed of a repetition of plus and minus "peaks" and "valleys" which introduce the necessary high frequency ripples (hereinafter referred to as interference ripples) into the unwanted payload FM output signal component present in the optical channel signal such that the interference caused by the payload signal component can be easily eliminated by operation of the low pass filter. This substantially improves the overhead SNR compared to existing detection techniques.

Another advantage of the present invention is that the overhead information is extracted optically by frequency discrimination without necessitating the conversion of the optical channel signal into an electrical form. By comparison to existing demodulation schemes, the invention provides an all-optical low cost, high gain technique for recovering the overhead information without having to do a complete optical channel signal demodulation.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

This invention provides a cost-efficient and effective demodulation scheme for extracting an overhead signal from an optical frequency channel signal carrying the overhead signal combined with a high frequency payload signal.

Figure 1:
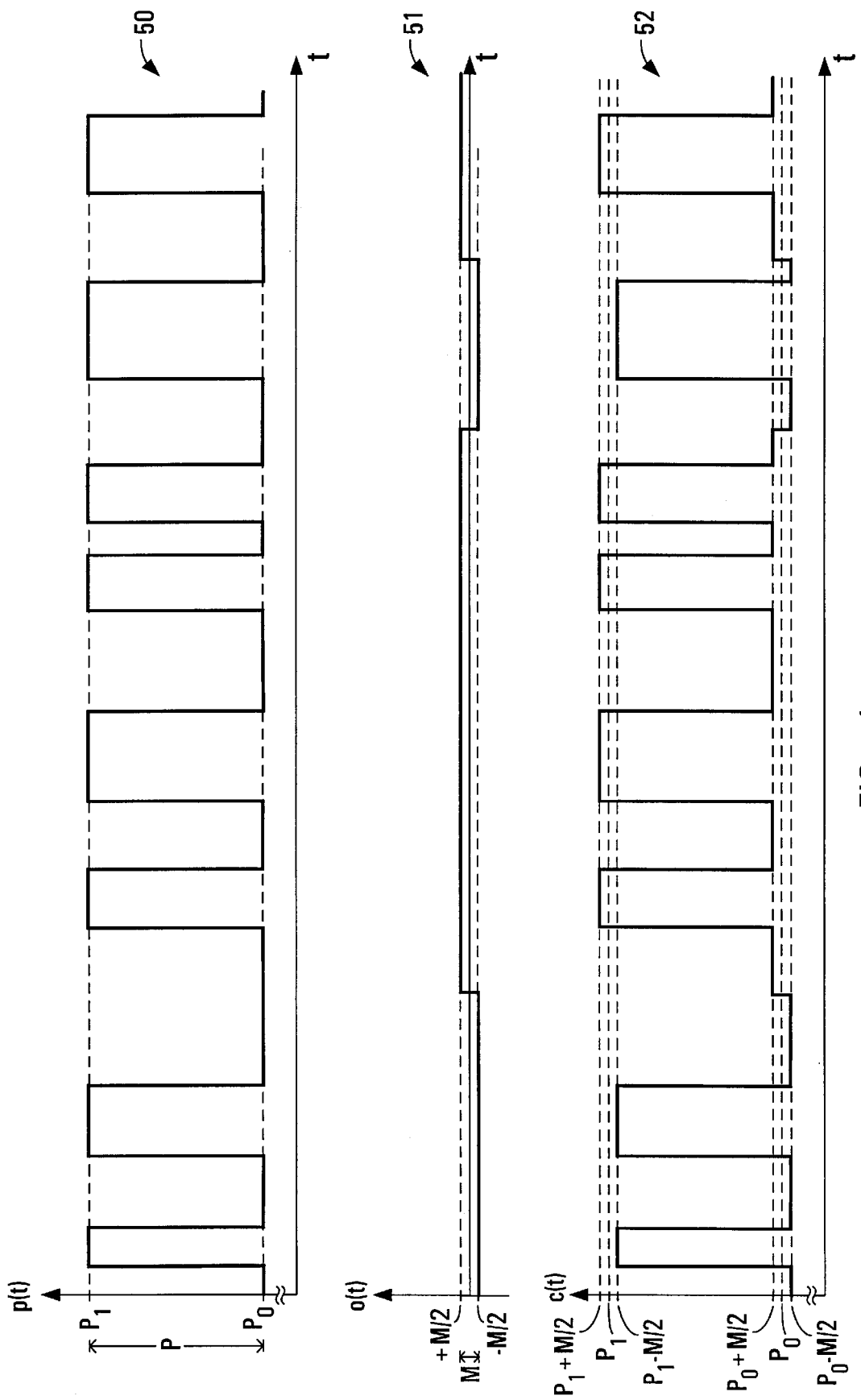
FIG. 1 shows three voltage/time plots of an arbitrary high-frequency digital payload signal p(t), an overhead signal o(t) and a composite signal c(t) formed of p(t) superimposed with o(t)

Presently, overhead data is transmitted in optical systems by superimposing the overhead signal carrying this information on the payload signal at fixed modulation depth which is typically 5% to 10% of the payload signal amplitude. An example of such method is illustrated in FIG. 1 where three voltage/time plots 50, 51, 52 are shown of an arbitrary high-frequency digital payload signal p(t) of peak-to-peak amplitude P, an overhead signal o(t) of peak-to-peak amplitude M and a composite signal c(t) formed of p(t) superimposed with o(t) with a resulting peak-to-peak amplitude of P+M. For transmission, c(t) is applied to a standard light source such as, for example, a laser diode to produce an optical signal representative of both the payload data contained in p(t) and overhead data contained in o(t).

As is well known, conventional laser sources such as laser diodes exhibit modulation characteristics which make them well-suited for transmitting information in optical systems. Varying laser input currents induce variations in the optical frequency (frequency modulation) and intensity (intensity modulation) of the laser output signal generated. Both the frequency variations and the intensity variations exhibited by a laser output are proportional to the input modulation applied and, as a result, can be used to convert information to an optical form for transmission.

For example, a digital signal can be applied to modulate the drive current of a laser diode between fixed amplitude levels above the lasing threshold such that the laser operates in a continuous mode and produces an optical frequency shift keyed (FSK) optical output in which the operating frequencies correspond to logic levels in the digital signal. This type of frequency modulation takes advantage of frequency variations produced in the laser output as a result of modulating the laser input current.

Variations in optical intensity (intensity modulation) can also be used to transmit the same information. As noted above, changes in the laser input current also produce intensity variations which can be used to represent information optically. Because of the ease of constructing intensity modulators and demodulators however, this type of modulation is currently the preferred optical modulation technique used for transmitting information optically.

Presently, payload and overhead data are both transmitted by intensity modulation. Typically, payload signals such as p(t) or composite payload and overhead signals such as, for example, c(t), are transmitted by using a simple type of intensity modulation technique commonly referred to as ON-OFF keying. In this modulation scheme, payload and overhead signals are applied to a direct modulation laser diode to modulate its input current at fixed amplitude levels above bias. This produces an ON-OFF keyed (OOK) optical channel signal whose intensity is representative of both the payload and overhead information. OOK modulation can also be achieved externally with the use of modulators and switches external to the laser source. External modulation is sometimes preferred as it permits the use of higher modulation frequencies than can be obtained by direct modulation of laser sources and does not induce any frequency variations in the optical signal produced.

Figure 2:
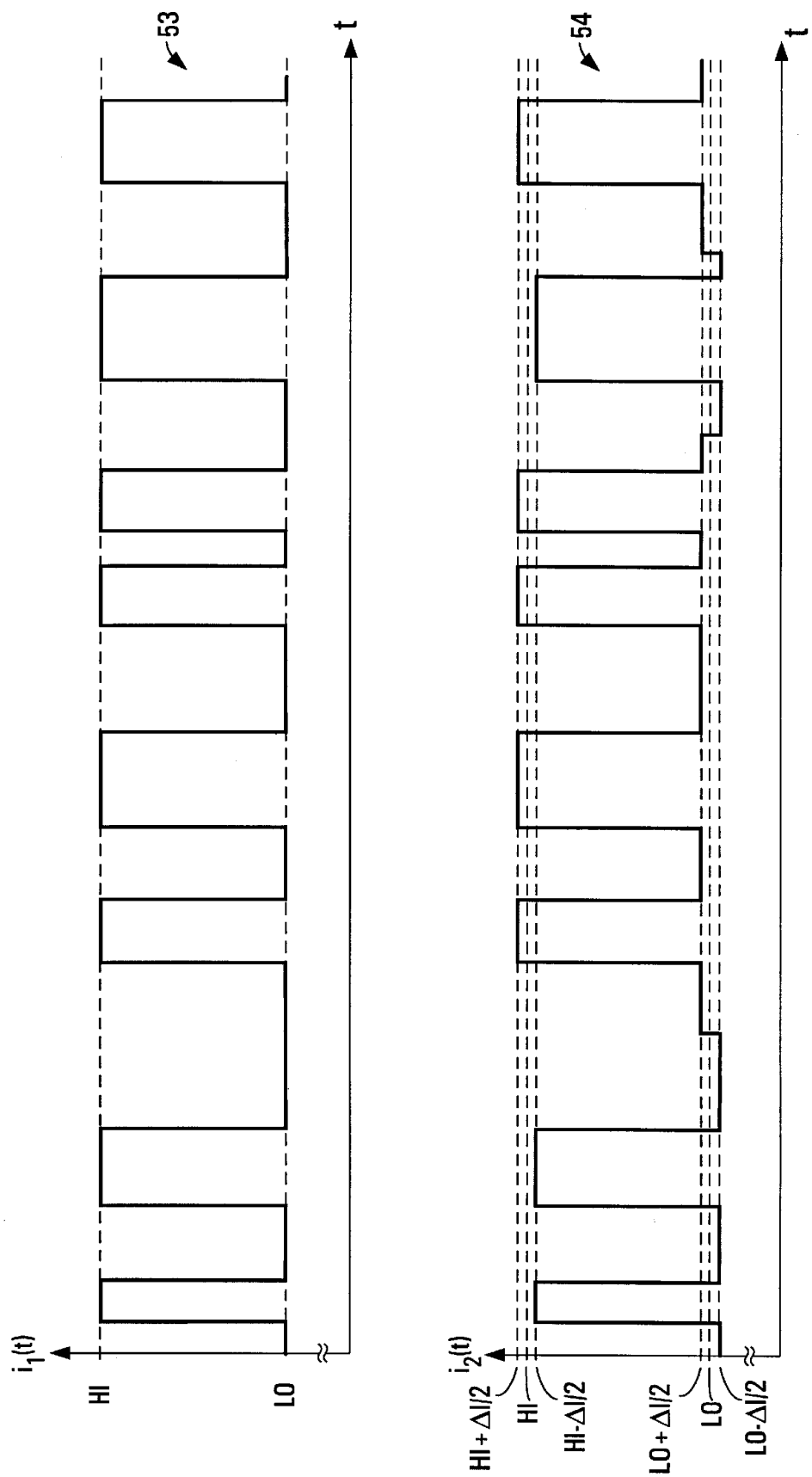
FIG. 2 shows two optical intensity/time plots of optical channel signals denoted by $i_1(t)$ and $i_2(t)$ which are respectively produced by a laser diode as a result of modulation by the payload signal p(t) and the composite signal c(t) of FIG. 1.

To further illustrate how overhead and payload signals are currently converted to an optical form, reference is now made to FIG. 2 where there is shown as an example two intensity/time plots 53, 54 of optical channel signals respectively produced by a laser diode as a result of modulation by the payload signal p(t) and the composite signal c(t) shown in FIG. 1. The first laser output plot 53 shows the variation in intensity $i_1(t)$ of the optical channel signal produced as a result of payload modulation by the payload signal p(t) while the second laser output plot 54 shows the intensity variation $i_2(t)$ in optical channel signal produced as a result of payload and overhead modulation by the composite signal c(t).

In the absence of overhead modulation, the optical channel signal produced and shown in the first plot 53 oscillates between a low intensity LO and a high intensity HI both above the lasing threshold. In this particular example, LO and HI intensities respectively correspond to payload "0s" and "1s". As noted above, when the payload signal p(t) is converted into an optical form by direct modulation, p(t) also induces frequency variations in the optical channel signal produced by the laser source modulated. These frequency variations are further discussed below in relation to FIG. 4.

As the overhead signal o(t) is superimposed on the payload signal p(t) to form the composite signal c(t), the optical channel signal produced experiences an additional intensity shift $\pm\Delta I/2$ centered around HI and LO. A magnified version of this intensity variation $\pm\Delta I/2$ is shown in the second laser output plot 54. Note that in this particular example, the additional intensity variation $\pm\Delta I/2$ is the result of the overhead signal o(t) not having any DC component (i.e. peak-to-peak amplitude M centred at 0). It is understood that the overhead signal o(t) could alternatively be positive, in which case the resulting intensity shift observed would vary from zero to $+\Delta I$. Alternatively, the overhead signal o(t) could be negative, in which case, the overhead signal o(t) would be subtracted from the payload signal p(t) and the resulting intensity shift would vary from zero to $-\Delta I$. For the purpose of example, the overhead signal o(t) is hereinafter assumed to have no DC component.

It is to be noted at this point that when direct modulation is used, the overhead signal o(t) also induces a frequency shift in the laser output signal. For a situation where the payload modulation is also external, this is in addition to the frequency variations introduced by the payload modulation (further details below). However, as noted above, only the intensity variations $i_1(t)$ and $i_2(t)$ produced in the optical channel signal are considered by conventional systems in transmitting and recovering the payload and overhead data. The frequency variations induced by direct payload and overhead modulation are all ignored. For a situation where external modulation is used, less frequency variations are induced in the optical channel signal. Typically in this case, a DC current is used to drive the laser source above threshold producing an optical channel signal which operates at a single frequency but whose intensity fluctuates by virtue of the external modulation according to the information transmitted. At the receiver, the information is typically recovered by measuring the intensity of the optical channel signal received.

In order to retrieve an overhead signal from an optical channel signal, conventional systems must first convert the optical channel signal to an electrical form before any manipulation of the overhead information can be carried out. In the example described above, the optical channel signal would have to be optoelectrically converted from optical OOK to electrical AM to produce an electrical signal whose amplitude is representative of c(t). After performing this optoelectrical conversion, the overhead signal o(t) would then be typically extracted by measuring the power (or voltage) amplitude of c(t) and processing the power measurements with known techniques to properly recover the overhead information.

Instead of relying on the intensity variations induced in the optical channel signal, the invention relies on the frequency variations incidentally produced by direct overhead modulation to extract the overhead data more efficiently. In particular, the present invention makes use of interferometry in an optical frequency demodulator to efficiently extract the overhead information by optical frequency discrimination which does not necessitate a complete signal demodulation.

The architecture and operation of the optical frequency demodulator provided by an embodiment of the invention will next be described in detail. To begin, however, the manner in which the optical channel signal is generated is detailed below, as this is required for an understanding of the description of the optical frequency demodulator.

The present invention takes advantage of thermal properties of standard laser diodes at relatively low frequencies to efficiently retrieve the overhead information by optical frequency discrimination of the received optical signal instead of electrical power amplitude detection. As is well known, when a direct modulation laser diode is modulated with a low frequency modulation input signal, thermal effects dominate and the resulting optical channel signal output produced as a result of the low frequency input signal experiences a large frequency shift (further details below). This frequency shift is proportional to the input current injected into the laser diode as well as the modulation frequency at which this current operates. As such, this frequency variation is typically given as a shift in frequency per milliampere as a function of modulation frequency and is commonly referred to as thermal chirp.

When a high frequency signal is applied to directly modulate a laser diode, the optical channel signal output also experiences a frequency shift which is proportional to the input current. However, in contrast to the frequency shift brought about by thermal chirp, this shift is caused by other well-known characteristics of the laser diode such as adiabatic chirp or relaxation oscillations but is not generally as significant as the shift caused by thermal chirp. In any event, if a low frequency overhead signal is superimposed on a high frequency payload signal to modulate a laser diode directly, the optical channel signal output will experience a frequency shift which is caused by the combined effect of these two signals.

In general, the thermal chirp of conventional laser diodes such as the distributed feedback (DFB) laser diode is known to be around 0.5 GHz per milliampere (mA) for modulating frequencies up to approximately 10 MHZ. To further illustrate this, reference is now made to FIG. 3 where a plot of the optical FM deviation transfer curve of a typical DFB laser diode is shown for a modulation frequency range extending from 0 Hz to 1 GHz. From this figure, it can be observed that the frequency shift of the DFB laser diode is approximately 0.5 GHz per mA for modulation frequencies up to around 10 MHz. This shift is principally caused by thermal chirp. For modulation frequencies over 10 MHz up to 1 GHz, it can be observed that there is a gradual roll-off of the amplitude of the laser diode output frequency swing. In this frequency range, the thermal effects decrease and the frequency swing is increasingly caused by other characteristics of the laser diode such as adiabatic chirp and relaxation oscillations.

This thermal chirp property which is characteristic of most standard laser diodes available today permits an efficient AM to FM conversion at low frequencies. By using thermal chirp, low frequency overhead signals can be efficiently converted into an optical format. As noted above, when a low frequency overhead signal is applied to a laser diode, the resulting optical channel signal output produced as a result of thermal effects experiences a large frequency shift which is proportional to the input current injected into the laser diode. For example, if a 1 mA overhead signal (peak-to-peak) is superimposed onto the payload signal modulation current of a DFB laser diode which is, for example, 40 mA, the optical FM deviation due to the overhead modulation will be around 0.5 GHz. Of course, there will also be a frequency shift caused by the presence of the payload signal. Although the frequency shift per mA caused by a high frequency signal such as a payload signal is usually smaller than that caused by low frequency signals, the payload frequency shift will be much greater than that induced by the low frequency overhead signal since the payload current is typically much greater than the current used for overhead.

Figure 4:
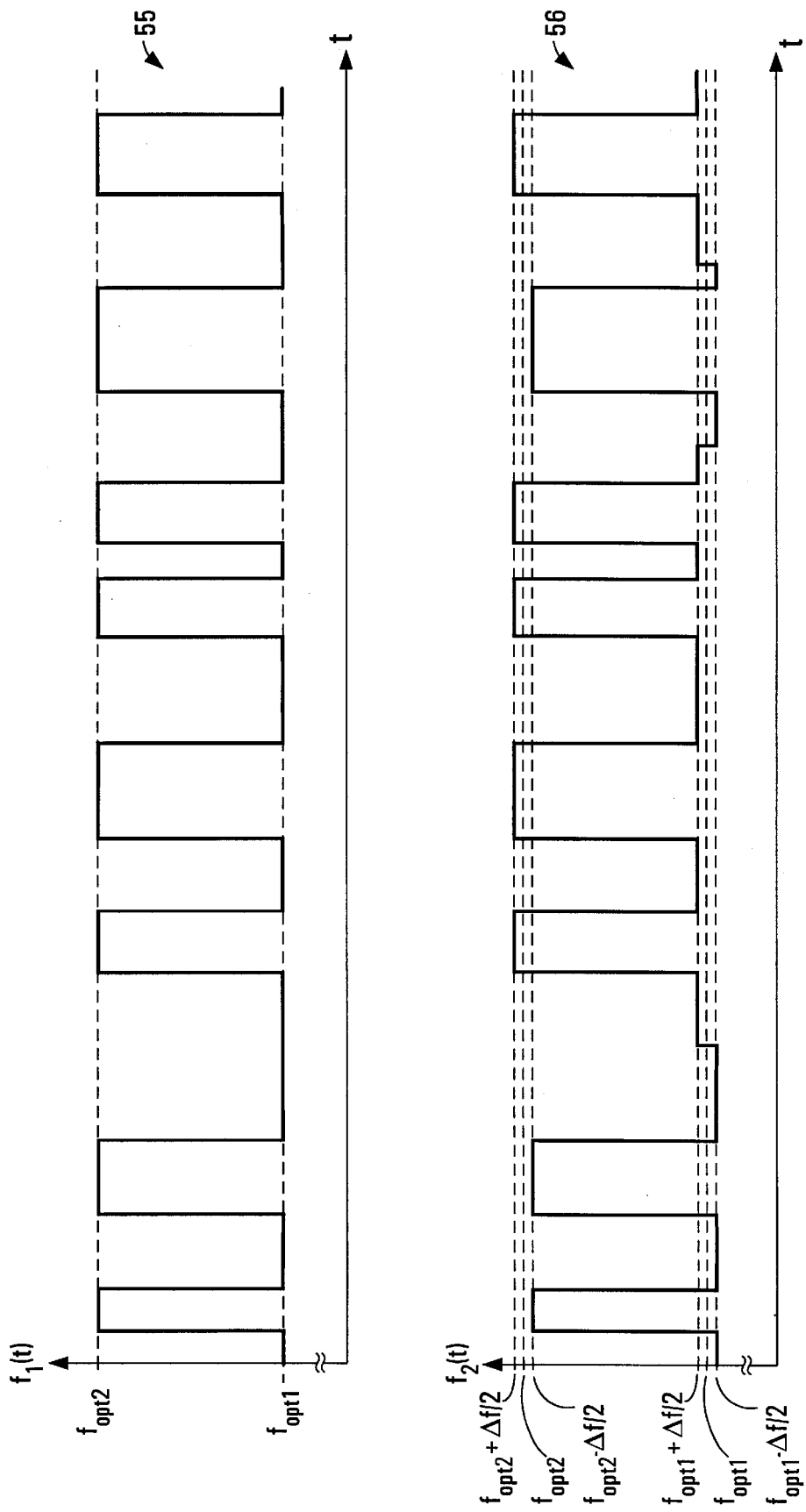
FIG. 4 shows two optical frequency/time plots of optical channel signals denoted by $f_1(t)$ and $f_2(t)$ which are respectively produced by a laser diode as a result of modulation by the payload signal p(t) and the composite signal c(t) of FIG. 1.

To further illustrate this, reference is now made to FIG. 4 where the frequency deviations introduced as a result of direct modulation by the payload signal p(t) and the composite signal c(t) of FIG. 1 are exemplified. In this figure, a first frequency plot 55 is shown to illustrate the frequency deviation $f_1(t)$ induced in an optical channel signal as a result of direct payload modulation. A second frequency plot 56 is used to illustrate the frequency deviation $f_2(t)$ in an optical channel signal which is produced under direct payload and overhead modulation. These frequency plots 55, 56 correspond to the intensity plots 53, 54 of the optical channel signal intensity variations $i_1(t)$ and $i_2(t)$ shown in FIG. 2.

In the absence of overhead modulation, the optical channel signal produced (see $f_1(t)$) oscillates between $f_{opt1}$ when transmitting a payload 0 and $f_{opt2}$ when transmitting a payload 1. For a situation where the payload modulation is external, the optical channel signal produced would operate at a single frequency such as, for example $f_{opt1}$ or $f_{opt2}$ and the payload data would be transmitted in the form of intensity variations. For the purpose of example, payload modulation is assumed to be direct and inducing frequency variations between $f_{opt1}$ and $f_{opt2}$ in the optical channel signal produced. For clarity, these particular frequencies are hereinafter referred to as the payload modulation frequencies.

As the overhead signal is superimposed onto the payload signal, the optical channel signal (see $f_2(t)$) experiences a frequency shift $\pm\Delta f/2$ away from the payload modulation frequencies $f_{opt1}$ and $f_{opt2}$. This frequency shift $\pm\Delta f/2$ is caused by thermal chirp of the laser source used. As noted above, this shift is directly proportional to the overhead current injected into the laser source as well as the overhead modulation frequency. Similarly to the shift in intensity $\pm\Delta I/2$, the additional frequency variation $\pm\Delta f/2$ is also the result of the overhead signal o(t) not having any DC component (i.e. peak-to-peak amplitude M centred at 0). It is understood that the overhead signal o(t) could alternatively be positive, in which case the resulting intensity shift observed would be zero to $+\Delta f$. Alternatively, the overhead signal o(t) could be negative, in which case, the overhead signal o(t) would be subtracted from the payload signal p(t) and the resulting intensity shift would be between zero to $-\Delta f$. For this example, the overhead signal o(t) is hereinafter assumed to have no DC component such that the frequency deviation it generates is $\pm\Delta f/2$.

In accordance with the present invention, the additional frequency shift $+\Delta f/2$ caused by the overhead signal is optically discriminated by interferometry with an asymmetrical Mach-Zehnder interferometer (AMZI) such that the overhead information can be subsequently extracted without having to perform a complete signal demodulation of the optical channel signal. According to the invention, the AMZI is implemented as a frequency discriminator to filter out the frequency variations introduced by the payload signal such that the frequency shift $+\Delta f/2$ caused by the overhead signal can be extracted and efficiently converted from FM to AM without complete signal demodulation.

Figure 5A:
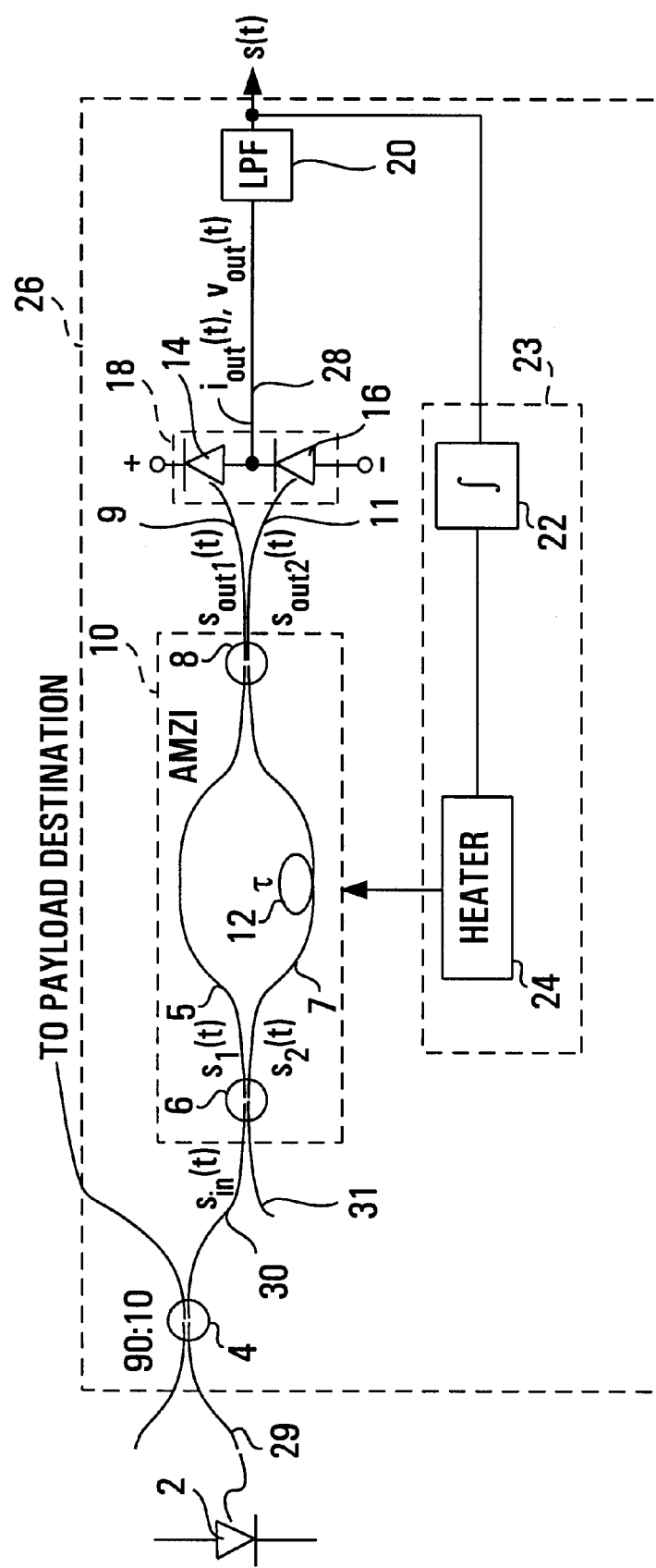
FIG. 5A is a schematic illustration of an optical frequency demodulation circuit according to a preferred embodiment of the invention featuring an asymmetrical Mach-Zehnder interferometer (AMZI)

In order to convert the overhead signal information from FM to AM, the AMZI is incorporated into an optical frequency demodulator. Referring now to FIG. 5A, there is illustrated a preferred embodiment of the optical frequency demodulator generally indicated by 26 which can be used in an optical terminal for recovering overhead information from an incoming optical channel signal. The optical channel signal is typically generated in a remote transmitter by a light source 2 such as, for example, a DFB laser diode, and transmitted to the optical terminal via a fiber link 29. At the optical terminal, the optical frequency demodulator 26 is coupled to the fiber link 29 via a fiber coupler 4 to tap a suitable amount of optical frequency channel signal power for proper overhead recovery. This could be, for example, 10% of the available optical power while the remainder portion (e.g. 90%) may be transmitted through to the intended payload destination which may be a neighboring payload detector (not shown) within the optical terminal or alternatively another optical terminal (not shown). For clarity, the optical channel signal power tapped in the coupler 4 is hereinafter defined as the optical channel signal received in the optical frequency demodulator 26 and is denoted by $s_{in}(t)$.

The optical frequency demodulator 26 of this invention has an AMZI generally indicated by 10 which has two inputs 30, 31 and two outputs 9, 11. The AMZI 10 is designed to receive the optical channel signal sin(t) in one input 30 while the other input 31 is left unconnected. The AMZI 10 consists of two 3 dB fiber couplers 6, 8 interconnected with two single-mode fiber arms 5, 7 and a delay line 12 of a variable length L located on arm 7. The AMZI outputs 9, 11 produce an intermediate optical signal in the form of complementary output signals which are denoted by $s_{out1}(t)$ and $s_{out2}(t)$. The AMZI outputs 9, 11 are each coupled to a respective photo-diode 14, 16. The photo-diodes 14, 16 are connected in a push-pull or balanced detection arrangement to form a balanced photodetector generally indicated by 18. The photo-detector 18 produces an electrical output signal $v_{out}(t)$ characterized by a current $i_{out}(t)$ which is fed on line 28 into a low pass filter 20 to produce a demodulated overhead signal denoted by s(t). The optical frequency demodulator 26 also comprises a feedback circuit loop generally indicated by 23 for maintaining the AMZI at a suitable operating point and also for temperature stabilization. This feedback loop 23 comprises an integrator 22 connected between the low pass filter 20 and a heating block 24 which, in turn, is connected to the AMZI 10.

In operation, the AMZI 10 functions to discriminate the frequency shift $\pm\Delta f/2$ introduced by the overhead signal such that the overhead information can be subsequently extracted without having to perform a complete signal demodulation of the optical channel signal traveling on the fiber link 29. For this, the optical channel signal power tapped in coupler 4 and carried by $s_{in}(t)$ is received in the AMZI input 30 in coupler 6. In the AMZI 30, the coupler 6 functions as a splitter, dividing the $s_{in}(t)$ optical channel signal power equally to form two optical signals, $s_1(t)$, $S_2(t)$ which respectively travel in the fiber arms 5 and 7. By operation of the delay line 12, the optical signal $S_2(t)$ propagating in arm 7 is delayed by a delay τ such that at the coupler 8, it interferes with the other optical signal $s_1(t)$ traveling in arm 5 to produce the complementary signals sout1(t) at output 9 and $s_{out2}(t)$ at output 11. The AMZI outputs 9, 11 are each characterized by a respective power transfer function $H_1(f)$, $H_2(f)$ which are known to be:

$$H_1(f)=A+B\sin^2(\Pi*f*\tau), H_2(f)=A+B\cos^2(\Pi*f*\tau)$$

where A and B are scaling factors.

Figure 5B:
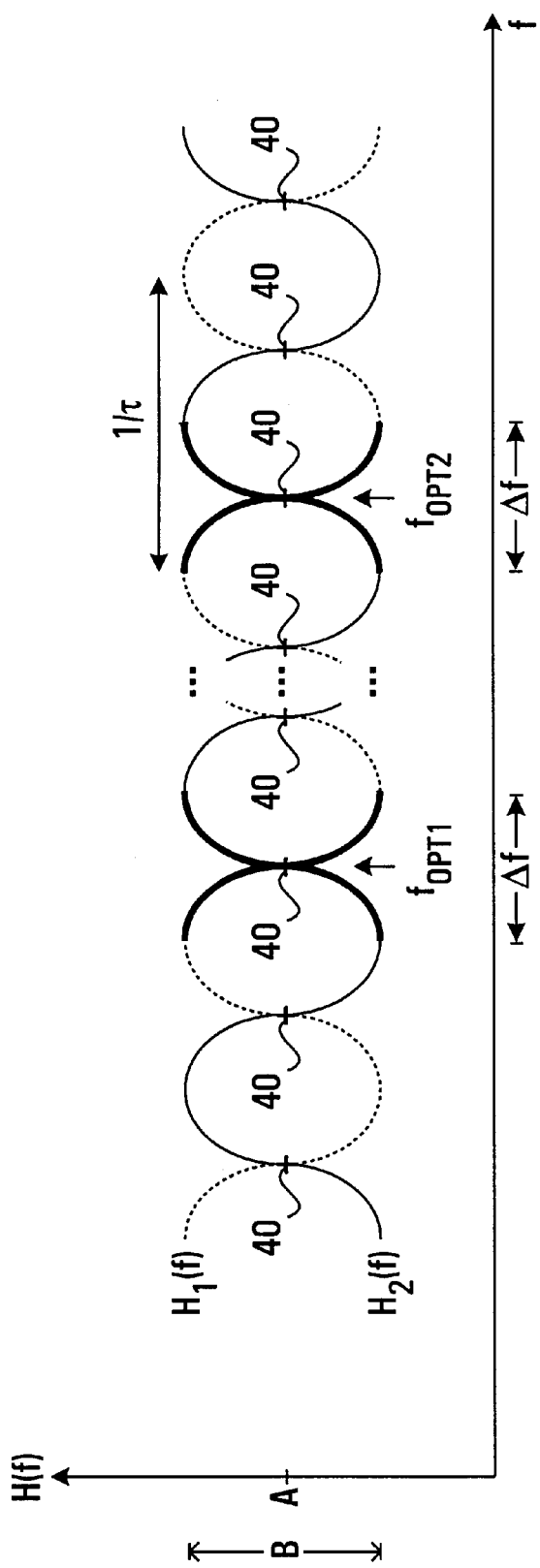
FIG. 5B is a diagram of the power transfer functions for the AMZI outputs.

FIG. 5B shows a frequency plot of each AMZI output power transfer function $H_1(f)$, $H_2(f)$ which are respectively drawn as a full and a dotted line. The period of free spectral range (FSR) for each AMZI outputs 9 and 11 is $\tau^{-1}$ and their respective power transfer functions $H_1(f)$, $H_2(f)$ are sinusoidal and "out of phase" by 180 degrees.

The AMZI output power transfer functions $H_1(f)$, $H_2(f)$ are indicative of the amount of optical power generated at each AMZI output 9, 11 as a function of the operative frequency of the input signal $s_{in}(t)$. In terms of optical power produced, the AMZI outputs 9, 11 are complementary to one another such that for any given $s_{in}(t)$ frequency, the sum of the optical power produced by each AMZI output 9, 11 is always equal to the amount of optical power carried by $s_{in}(t)$ at that particular frequency. In particular, the power transfer functions of the AMZI outputs 9, 11 exhibit quadrature points 40 at which the AMZI outputs 9, 11 produce the same amount of optical power.

With this particular cyclical frequency response, the AMZI 10 introduces high frequency interference ripples into the optical signal $s_{in}(t)$ passed through such that the frequency shift caused by payload modulation can be substantially eliminated in the low pass filter 20. As a result, the overhead frequency shift ±Δf/2 present in the optical channel signal can be discriminated to retrieve the overhead information (further details below). In order to discriminate the overhead frequency shift ±Δf/2, the AMZI 10 is designed such that the overhead frequency deviation ±Δf/2 can lie completely within a half FSR period (of duration ½τ) centered around each payload modulation frequency $f_{opt1}$ and $f_{opt2}$. The AMZI 10 is also designed such that the payload modulation frequencies $f_{opt1}$ and $f_{opt2}$ are maintained on quadrature points 40. As will be further explained below, by maintaining $f_{opt1}$ and $f_{opt2}$ on quadrature points 40, the overhead frequency shift ±Δf/2 induced there around is advantageously positioned within high slope regions of the AMZI output transfer functions $H_1(f)$, $H_2(f)$ which provides a high gain discrimination of the overhead information.

The following section will now describe the preferred manner in which the AMZI 10 is designed to confine the overhead frequency shift ±Δf/2 within a half FSR period and maintain $f_{opt1}$ and $f_{opt2}$ on quadrature points 40. This will be followed by a detailed description of the operation of the optical frequency demodulator 26 to discriminate the overhead frequency shift ±Δf/2 and demodulate the overhead information thereafter.

For optimal overhead discrimination and demodulation, the AMZI 10 is designed such that the overhead frequency deviation ±Δf/2 lies completely within a half FSR period of the AMZI output transfer functions $H_1(f)$, $H_2(f)$. According to the invention, this is nominally carried out by adjusting the variable length L of the delay line 12 (see FIG. 5A). More accurate real-time control of the AMZI output transfer functions $H_1(f)$, $H_2(f)$ is done using the feedback loop 23 as described below.

Figure 3:
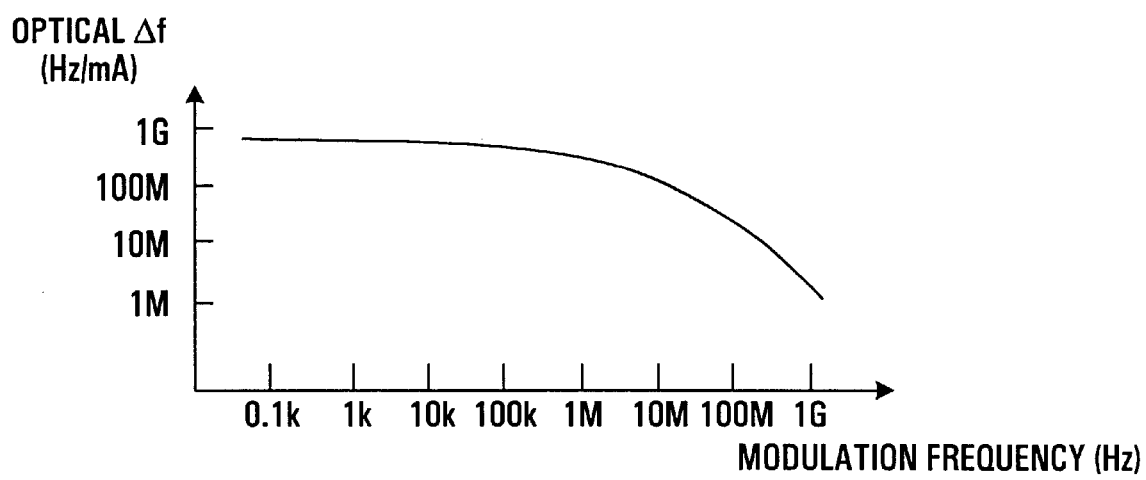
FIG. 3 is a graphical representation of an optical frequency modulation (FM) deviation transfer curve of a distributed feedback (DFB) laser diode.

In order to determine the necessary length L, the overhead frequency shift ±Δf/2 must be known and can generally be determined for a particular overhead signal current by reference to the optical characteristics of the particular laser source employed (see FIG. 3). With a knowledge of the desired overhead frequency shift ±Δf/2 for a particular overhead signal current, the necessary FSR period (1/τ) is calculated as being twice the upper limit of the overhead frequency shift ±Δf/2:

$$(1/\tau) \geq 2*(\Delta f/2-(-\Delta f/2));$$

$$\geq 2\Delta f$$

With the FSR period (1/τ) determined, the corresponding delay τ can be identified since, as noted above, an FSR period is equal to 1/τ. If the effective refractive index $\eta_{eff}$ of the fiber arms 16, 18 is known, the desired fiber length, L, for a time delay τ can be determined using the following equation:

$$L=(c/\eta_{eff})*\tau$$

where c is the speed of light in vacuum.

As an example, it can be determined by reference to the optical characteristics of the particular laser source employed that for any overhead signal with a modulation frequency less than 10 MHz, the frequency deviation per mA (Δf/mA) produced as a result is approximately constant at 500 MHz/mA. If a 1 mA (peak-to-peak) overhead signal with no DC component is used, the resulting frequency shift is ±Δf/2 or ±500 MHz/2. This frequency shift extends over a frequency band Δf of 500 MHz. In order to ensure that the frequency shift ±Δf/2 fits completely within a half FSR period, the 500 MHz band over which it extends must also fit completely within that half FSR period. Using the above expression for 1/τ:

$$1/\tau \geq 2\Delta f=2*(500*10^6)$$

From this, the necessary delay τ for the delay line 12 (see FIG. 5A) can be calculated as follows:

$$\tau \leq 1/(2\Delta f)=10^{-9}=1nS$$

According to the above, in order to have the +500 MHz/2 frequency shift induced by a 1 mA overhead signal fit completely within a half FSR period, it follows that τ must be at least 1 nS. If the effective refractive index of the fiber arms 16, 18 is known to be $\eta_{eff}=1.5$, the desired fiber length, L, for a time delay τ=1nS can be determined with the above equation as follows:

$$L=(c/\eta_{eff})*\tau=(3*10^8 \text{ m/S})/1.5*1 \text{ } nS=0.5 \text{ meter}$$

Once the proper delay line 12 to has been determined, the AMZI frequency response must be tuned in order to maintain $f_{opt1}$ and $f_{opt2}$ on quadrature points 40. For conventional AMZIs such as the AMZI 10, it has been observed that the location of any particular peak of the sinusoidal AMZI power transfer functions $H_1(f)$, $H_2(f)$ shifts with temperature at about 10 ppm/° C. By controlling the temperature at which the AMZI 10 operates, the AMZI output transfer functions $H_1(f)$, $H_2(f)$ can be controlled to maintain $f_{opt1}$ and $f_{opt2}$ on quadrature points 40. In the preferred embodiment of FIG. 5A, the operating temperature of the AMZI 10 is controlled by operation of the feedback loop 23. The feedback loop 23 is connected between the output of the low pass filter 20 and the AMZI 10 such that the AMZI output transfer functions $H_1(f)$, $H_2(f)$ can be adjusted to counteract for any frequency drifts observed in $f_{opt1}$ and $f_{opt2}$. These frequency drifts are a common occurrence in conventional laser sources and are typically caused by power source fluctuations and laser aging. According to the invention, the feedback loop 23 operates to compensate for these frequency drifts and maintain $f_{opt1}$ and $f_{opt2}$ on quadrature points 40.

The temperature feedback compensation described above is based on the balanced detector output current $i_{out}(t)$ observed at point 28 which, according to the invention, provides an indication of whether or not $f_{opt1}$ and $f_{opt2}$ are located on quadrature points 40. As is well known, for a balanced photo-detector such as the balanced photo-detector 18 of FIG. 5A, the output current $i_{out}(t)$ produced on line 28 is proportional to the difference in the amounts of optical power detected at each photo-diode 14, 16. Assuming that the amount of optical power produced by each AMZI output 9, 11 is respectively $P_{out1}(t)$ and $P_{out2}(t)$ and that the photo-diodes 14, 16 have the same responsivity $\eta$, then the output current $i_{out}(t)$ is given by:

$$i_{out}(t) = \eta * (P_{out1}(t) - P_{out2}(t))$$

When the AMZI 10 exhibits quadrature points at $f_{opt1}$ and $f_{opt2}$ it can be determined from the AMZI output transfer functions $H_1(f)$, $H_2(f)$ that, on average, the AMZI outputs 9, 11 produce the same optical power and as such, $P_{out1}(t) = P_{out2}(t)$ According to the above equation, when this occurs, the current $i_{out}(t)$ produced at the output of the balanced detector 18 is zero. If the current $i_{out}(t)$ has a non-zero average, its polarity will indicate which way $f_{opt1}$ and $f_{opt2}$ are offset and its amplitude will indicate how much $f_{opt1}$ and $f_{opt2}$ are offset. In order to properly tune the AMZI 10 to compensate for any frequency offset in $f_{opt1}$ and $f_{opt2}$, the output current $i_{out}(t)$ is fed into the feedback loop 23 where it is converted into a temperature control which can then be applied to the AMZI 10 for tuning its frequency response accordingly.

There are many ways in which a current offset may be converted into a temperature variant for adjusting the AMZI frequency response. In the preferred embodiment of FIG. 5A, the output current $i_{out}(t)$ is first low pass filtered in the low pass filter 20 and subsequently integrated in the integrator 22 to provide a averaged measure of the AMZI frequency response offset. The output of the integrator 22 is then fed into the heater block 24 which operates to convert the AMZI frequency offset into a corresponding temperature control value such that the AMZI 10 can either be heated or cooled according to which way the AMZI frequency response is offset.

More specifically, when the AMZI 10 exhibits quadrature points at $f_{opt1}$ and $f_{opt2}$, the integrator output is be zero. When this occurs, the heater block 24 does not produce any temperature variant and the AMZI 10 is said to be tuned. If $f_{opt1}$ and $f_{opt2}$ are not on quadrature points 40, the integrator output will be non-zero. Similarly to the output current $i_{out}(t)$, the integrator output polarity will indicate which way $f_{opt1}$ and $f_{opt2}$ are offset and its amplitude will indicate how much $f_{opt1}$ and $f_{opt2}$ are offset. As a result of the offset, the heater block 24 will then apply a corresponding temperature adjustment to the AMZI 10 to shift its output transfer functions $H_1(f)$, $H_2(f)$ such that $f_{opt1}$ and $f_{opt2}$ are maintained on quadrature points 40.

According to the invention, the feedback loop 23 also operates to compensate for any temperature variations in the ambient environment which may alter the AMZI output transfer functions $H_1(f)$, $H_2(f)$ and offset $f_{opt1}$ and $f_{opt2}$ from quadrature points 40. As noted above, the location of any particular peak of the sinusoidal AMZI power transfer functions $H_1(f)$, $H_2(f)$ shifts with temperature at about 10 ppm/° C. Because these temperatures fluctuations would also cause $f_{opt1}$ and $f_{opt2}$ to be offset from quadrature points 40, a corresponding offset would also be observed in the balanced detector output current $i_{out}(t)$. This current offset would then be processed by the integrator 22 and the heater block 24 of the feedback loop 23 in the manner described above to temperature control the AMZI 10 and maintain $f_{opt1}$ and $f_{opt2}$ on quadrature points 40. Preferably, the integrator 22 is designed with a slow time constant such that the integrator output is only representative of the frequency drifts in $f_{opt1}$ and $f_{opt2}$ and temperature variations occurring within the optical frequency demodulator 26.

Once the AMZI 10 is properly tuned to an operating point where the payload modulation frequencies $f_{opt1}$ and $f_{opt2}$ are maintained on quadrature points and the overhead frequency deviation $\pm \Delta f/2$ completely lies within a half FSR period centered around $f_{opt1}$ and $f_{opt2}$, the AMZI 10 is then in a position to discriminate the overhead frequency shift $\pm \Delta f/2$ for an optimal demodulation of the overhead information by the balanced detector 18. Referring now briefly back to FIG. 5A, the balanced detector 18 demodulates the overhead information by photoelectrically converting the AMZI output signals $S_{out1}(t)$, $S_{out2}(t)$ to produce the electrical signal $v_{out}(t)$ on line 28 whose current $i_{out}(t)$ characteristic is a function of the optical power produced by each AMZI outputs 9, 11 (see above). In order to retrieve the overhead information, the signal $v_{out}(t)$ is fed into the low pass filter 20 which operates to eliminate the high frequency components present therein and produce the high gain signal s(t) which is representative of the original overhead information originally encoded at the transmitter in the optical channel signal.

Figures 6A, 6B:
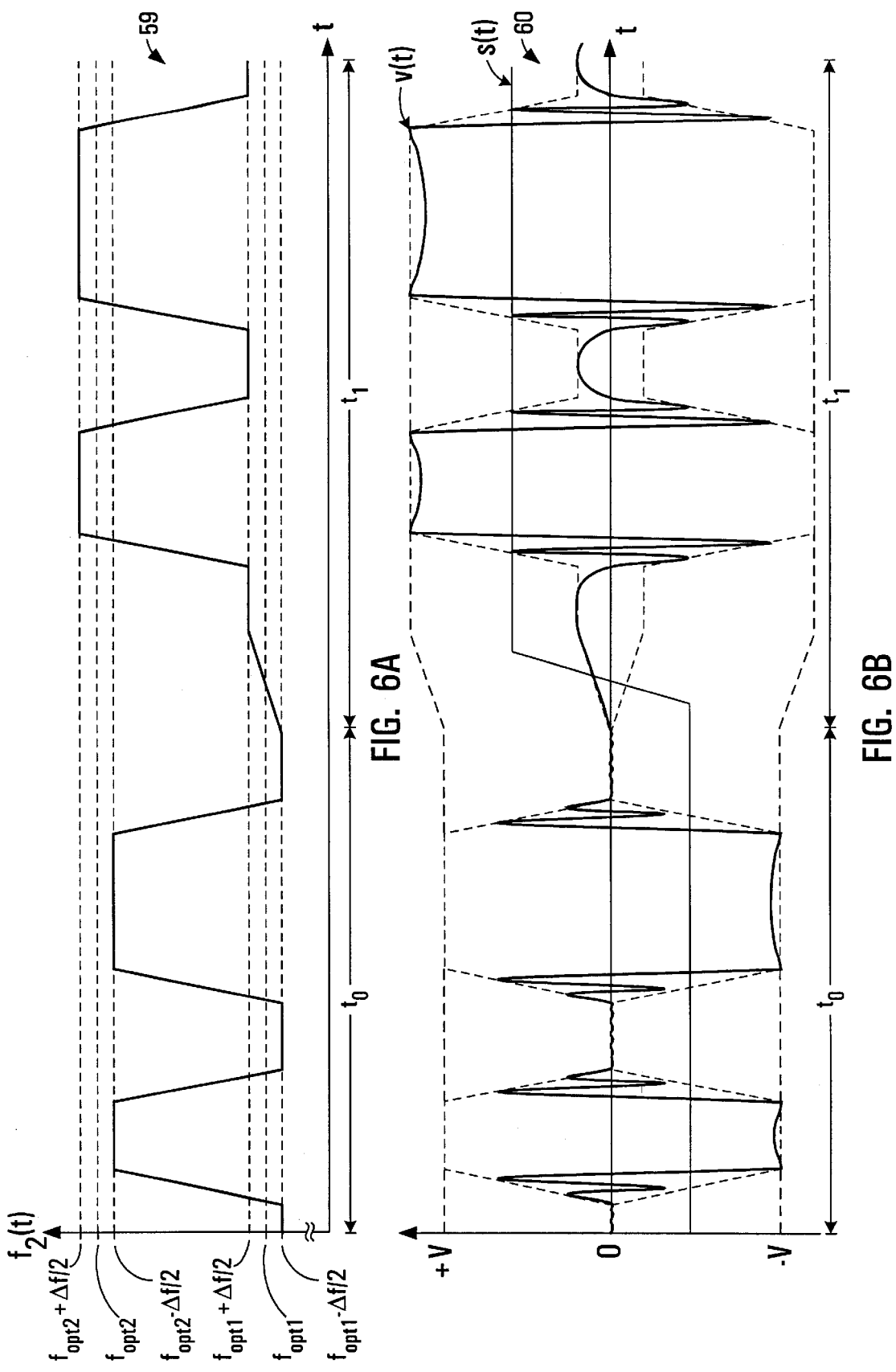
FIG. 6A is a magnified optical frequency/time plot of a first portion of $f_2(t)$ of FIG. 4.
FIG. 6B are two magnified voltage/time plots of electrical signals produced by the circuit of FIG. 5A.

To further illustrate this, reference is now made to FIGS. 6A and 6B. FIG. 6A shows a magnified plot 59 of a first portion of the frequency deviation $f_2(t)$ of the optical channel signal shown in FIG. 4 while FIG. 6B show a voltage/time plot 60 of the signal $v_{out}(t)$ and the resulting low pass filter output s(t) produced as a result of the frequency deviation $f_2(t)$ shown in FIG. 6A. For clarity, these plots 59, 60 are shown with reference time intervals t0 and t1. Time interval to show the frequency shift induced during an overhead "0" while time interval t1 show the frequency shift induced during an overhead "1".

During an overhead 0 (t0), it can be observed that the balanced detector 18 (see FIG. 5A) operates to average out the DC level fluctuations caused by the payload frequency shift such that $v_{out}(t)$ oscillates around 0V between positive and negative voltage amplitudes respectively denoted by +V and −V. In particular, during an overhead 0 (t0), the optical channel signal experiences a frequency shift of $-\Delta f/2$ and operates at $f_{opt1} - \Delta f/2$ for a payload "0" and at $f_{opt2} - \Delta f/2$ for a payload "1". At these particular frequencies, most of the $S_{in}(t)$ optical channel signal power going into the AMZI 10 is transferred to the AMZI output 11 such that the resulting voltage produced by the balanced detector 18 is negative. However, for a payload 0, the optical channel signal sin(t) is generated at a low intensity LO and as a result, the negative voltage produced by the balanced detector 18 at this particular frequency $f_{opt1} - \Delta f/2$ is low. As such, this voltage is approximated in FIG. 6B to 0 volt. In contrast, for a payload 1, the optical channel signal $s_{in}(t)$ is generated at $f_{opt2}-\Delta f/2$ with a high intensity HI which, when converted by the balanced detector 18, turns into a high negative voltage $-V$. As the optical channel signal frequency changes from $f_{opt1}-\Delta f/2$ to $f_{opt2}-\Delta f/2$, the AMZI 10 introduces interference ripples which result in high frequency oscillations in $v_{out}(t)$.

During an overhead 1 (ti), the optical channel signal $s_{in}(t)$ experiences a shift $+\Delta f/2$ in optical frequency along the half FSR period around $f_{opt1}$ and $f_{opt2}$ such that $v_{out}(t)$ changes polarity and is of a higher amplitude than the voltage amplitude V. More specifically, during an overhead 1, the optical channel signal $s_{in}(t)$ is operating at $f_{opt1}+\Delta f/2$ for a payload "0" and at $f_{opt2}+\Delta f/2$ for a payload "1". At these particular frequencies, most of the optical channel signal power going into the AMZI 10 is transferred to the AMZI output 9 such that the resulting voltage $v_{out}(t)$ produced by the balanced detector 18 is positive. For a payload 0, the optical channel signal $s_{in}(t)$ is generated at a low intensity LO and hence the positive voltage produced by the balanced detector 18 is also low, although not as low as the voltage produced during an overhead 0 (t0). For a payload 1, the optical channel signal $s_{in}(t)$ is generated with a high intensity HI which, when converted by the balanced detector 18, turns into a high positive voltage amplitude higher than V. Similarly to operations during an overhead "0", the AMZI 10 also introduces interference ripples as the optical channel signal frequency changes from $f_{opt1}+\Delta f/2$ to $f_{opt2}+\Delta f/2$, which result in high frequency oscillations in $v_{out}(t)$.

From FIG. 6B, it is apparent that during an overhead 0 (t0), s(t) is on average negative while during an overhead 1 (t1), s(t) is on average positive. However, the polarity change occurring when the overhead data changes from a 0 to 1 or from 1 to 0 combined with a change in voltage amplitude permits a high gain recovery of the overhead information in the low pass filter 20. Additionally, the low pass filter 20 operates to filter out the high frequencies contained in $v_{out}(t)$ and extract therefrom the overhead information to produce the high gain signal s(t).

Although embodiments of the invention have been described above, it is not limited thereto and it will be apparent to those skilled in the art that numerous modifications form part of the present invention insofar as they do not depart from the spirit, nature and scope of the claimed and described invention.

The AMZI has been described above as providing the frequency discrimination necessary to extract overhead information from an optical channel signal. It is to be understood that other interferometers could be used. More generally, other frequency discriminators could also be used provided they exhibit complimentary cyclical transfer functions to discriminate the overhead information in accordance with the principles described therein.

The AMZI has been described above as implemented with two fiber couplers (alternatively referred to as splitters) interconnected with two single-mode fiber arms and a delay line. It is to be understood that other implementations could be used. For example, the AMZI could alternatively be implemented with fused bionic tapered filters or planar light wave circuitry and still provide optical frequency discrimination in accordance with the present invention.

The present invention is not restricted to the balanced photo-detector described therein. Any other photodetector capable of dynamically subtracting two optical signals to produce an electrical signal whose current is proportional to the difference in optical power of the two optical signals could also be used. Also, the invention is not restricted to the particular AMZI tuning implementation means described therein. The AMZI feedback control could alternatively be implemented with any actuating means capable of converting a difference in optical power into a temperature adjustment.

While the feedback loop scheme has been described above as incorporating a block heater for tuning the AMZI, it is to be understood that other tuning means could be used for thermally adjusting the AMZI to maintain the desired frequency response. For example, a resistive heater or a thermoelectric cooler could also be used. Further, it is also to be understood that other operating frequency stabilization means could be used to counteract temperature or other variations in the optical frequency demodulator without departing from the scope of the invention.

Further, the invention has been described above in relation to direct payload intensity modulation scheme by which a laser source is directly modulated to produce an ON-OFF keyed output whose intensity represents binary values of a modulating signal. It is understood that the invention could also be used with other payload intensity modulation techniques. For example, external modulation could alternatively be used. In this particular case, the payload modulation would introduce much less frequency variations in the optical channel signal produced and the optical channel signal would operate at a single payload carrier modulation frequency such as, for example, $f_{opt1}$ or $f_{opt2}$ around which the frequency shift $\pm\Delta f/2$ caused by the direct overhead modulation would be induced. It is to be understood that even in the absence of any substancial frequency variations caused by the payload modulation, the frequency shift $\pm\Delta f/2$ caused by the overhead signal can still be optically discriminated by the AMZI in accordance with the principles recited therein. As such, the AMZI would be designed as described above such that the overhead frequency deviation $\pm\Delta f/2$ can lie completely within a half FSR period centered around the payload carrier modulation frequency. The AMZI would also be designed such that the payload carrier modulation frequency is maintained on a quadrature point to position the frequency shift $\pm\Delta f/2$ within a high slope region of the AMZI output transfer functions and provide high gain discrimination of the overhead data as was described above.

We claim:

1. A method for selectively demodulating a first information stream from an input optical signal containing the first information stream and a second information stream, the input optical signal being characterized by frequency variations in a first frequency band which are representative of the first information stream and frequency variations in a second frequency band which are representative of the second information stream, the method comprising:

using interferometry to introduce a plurality of interference ripples in the second frequency band of the input optical signal spectrum and discriminate the frequency variations in the first frequency band from the input optical signal to produce an intermediate optical signal; and converting the intermediate optical signal to an electrical signal representative of the first information stream.

2. The method of claim 1 wherein an asymmetrical interferometer is used to introduce the plurality of interference ripples in the second frequency band of the input optical signal and discriminate the frequency variations in the first frequency band from the input optical signal to produce the intermediate optical signal.

3. The method of claim 2 wherein converting the intermediate optical signal to an electrical signal representative of the first information stream is done by balanced photo-detecting and filtering.

4. The method of claim 3 wherein filtering comprises low pass filtering.

5. The method of claim 2 wherein for discriminating the first frequency band from the input optical signal, the method further comprising stabilizing the asymmetrical interferometer at an operating point.

6. The method of claim 5 wherein for stabilizing the asymmetrical interferometer a the operating point, the method further comprising:
   producing a control signal representing an asymmetrical interferometer deviation from the operating point; and
   thermally tuning the asymmetrical interferometer to the operating point using the control signal produced.

7. The method of claim 6 wherein the asymmetrical interferometer is an asymmetrical Mach-Zehnder interferometer (AMZI) and the intermediate optical signal consists of a first and second AMZI output signals.

8. The method of claim 7 wherein producing the control signal comprises generating a control signal current representing a difference in optical power between the first and second AMZI output signals.

9. The method of claim 8 wherein generating the control signal current comprises photo-detecting the optical power in the first and second AMZI output signals and processing the optical power photo-detected to produce a difference between the optical power in the first AMZI output signal and the optical power in the second AMZI output signal.

10. The method of claim 9 wherein for thermally tuning the AMZI with the control signal current, the method further comprises:
   averaging the control signal current using an averaging block;
   converting the averaged control signal into a temperature adjustment using a temperature control unit; and
   applying the temperature adjustment to the AMZI.

11. The method of claim 10 wherein the first and second information streams respectively carry overhead and payload information.

12. The method of claim 11 wherein the input optical signal has been generated based on a composite signal of a payload signal containing the payload information added to an overhead signal containing the overhead information.

13. The method of claim 12 wherein the payload information contained in the input optical signal is characterized by a plurality of payload modulation frequencies which are located within the second frequency band.

14. The method of claim 13 wherein the overhead signal is frequency shift keyed on the payload signal.

15. The method of claim 14 wherein the AMZI has a cyclical frequency response defining quadrature points and is tuned by maintaining the plurality of payload modulation frequencies on quadrature points of the AMZI frequency responses such that at each one of the payload modulation frequencies, the first frequency band containing the overhead information lies within half a cycle of the AMZI frequency response.

16. An optical frequency demodulator for selectively demodulating a first information stream from an input optical signal containing the first information stream and a second information stream, the input optical signal being characterized by frequency variations in a first frequency band which are representative of the first information stream and frequency variations in a second frequency band which are representative of the second information stream, the optical frequency demodulator comprising:
   a asymmetrical interferometer operable to introduce a plurality of interference ripples in the second frequency band of the input optical signal spectrum and discriminate the frequency variations in the first frequency band from the input optical signal to produce an intermediate optical signal;
   a photo-detector operable to convert the intermediate optical signal to an electrical signal representative of the first information stream; and
   a filter operable to filter the electrical signal to approximate the first information stream.

17. The optical frequency demodulator of claim 16 wherein the asymmetrical interferometer is an asymmetrical Mach-Zehnder interferometer (AMZI) with a cyclical frequency response.

18. The optical frequency demodulator of claim 17 wherein the AMZI comprises:
   an optical splitter connected to receive the input optical signal and operable to divide the input optical signal received between two unbalanced paths for producing two unbalanced path signals;
   an optical coupler operable to combine the unbalanced path signals for producing the intermediate optical signal in the form of a first and second AMZI output signals.

19. The optical frequency demodulator of claim 18 wherein the unbalanced paths have a path unbalance optical de selected such that the first frequency band containing the first information stream lies within half a cycle of the AMZI frequency response and the second frequency band extends over a plurality of cycles of the AMZI frequency response.

20. The optical frequency demodulator of claim 19 wherein the photo-detector consists of a pair of photo-diodes connected in a balanced push-pull arrangement, each photo-diode being respectively operable to receive the first and second AMZI output signals for jointly producing the electrical signal.

21. The optical frequency demodulator of claim 20 wherein the filter is a low pass filter.

22. The optical frequency demodulator of claim 21 wherein to discriminate the frequency variations in the first frequency band from the input optical signal, the AMZI is thermally stabilized to an operating point.

23. The optical frequency demodulator of claim 22 further comprising tuning means for thermally maintaining the AMZI at the operating point.

24. The optical frequency demodulator of claim 23 wherein the tuning mean are operable to receive a control signal derived from the AMZI which represents the AMZI deviation from the operating point, the tuning means being also operable to thermally adjust the AMZI based on the control signal received to maintain the AMZI at the operating point.

25. The optical frequency demodulator of claim 24 wherein the control-signal is a control signal current representing a difference in optical power between the first and second AMZI output signals.

26. The optical frequency demodulator of claim 25 wherein the control signal current is generated by the photo-diodes in proportion to the optical power difference between the first and second AMZI output signals.

27. The optical frequency demodulator of claim 26 wherein the tuning means form a feedback loop connecting the low pass filter and the AMZI.

28. The optical frequency demodulator of claim 27 wherein the tuning means comprise:
   an averaging unit connected to receive the control signal current and produce therefrom an averaged control, signal current; and a temperature adjustment unit connected to the averaging unit to receive the averaged control signal current and adjust the operating temperature of the AMZI based on the averaged control signal received.

29. The optical frequency demodulator of claim 28 wherein temperature adjustment unit is a heating block.

30. The optical frequency demodulator of claim 28 wherein temperature adjustment unit is a resistive heater.

31. The optical frequency demodulator of claim 28 wherein temperature adjustment unit is a thermoelectric cooler.

32. The optical frequency demodulator of claim 28 wherein the averaging unit is an integrator.

33. The optical frequency demodulator of claim 16 wherein the first and second information streams respectively carry overhead and payload information.

34. The optical frequency demodulator of claim 33 wherein the input optical signal has been generated based on a composite signal of a payload signal containing the payload information added to an overhead signal containing the overhead information.

35. The optical frequency demodulator of claim 34 wherein the payload information contained in the input optical signal is characterized by a plurality of payload modulation frequencies located within the second frequency band.

36. The optical frequency demodulator of claim 35 wherein the overhead signal has been frequency shift keyed on the payload signal.

37. The optical frequency demodulator of claim 36 wherein the asymmetrical interferometer is an asymmetrical Mach-Zehnder interferometer (AMZI) with a cyclical frequency response, and wherein the cyclical frequency response of the AMZI defines quadrature points and the AMZI is tuned by maintaining each one of the plurality of payload modulation frequencies on a respective quadrature point of the AMZI frequency response such that at each one of the payload modulation frequencies, the first frequency band lies within half a cycle of the AMZI frequency response.

38. A method for selectively demodulating a first information stream from an input optical signal containing the first information stream and a second information stream, the input optical signal being characterized by frequency variations which are representative of the first information stream and intensity variations which are representative of the second information stream, the method comprising:

using interferometry for discriminating the frequency variations in the input optical signal to produce an intermediate optical signal; and converting the intermediate optical signal to an electrical signal representative of the first information stream.

39. The method of claim 38 wherein an asymmetrical interferometer is used for discriminating the frequency variations in the input optical signal to produce the intermediate optical signal.

40. The method of claim 39 wherein converting the intermediate optical signal to an electrical signal representative of the first information stream is done by balanced photo-detecting and filtering.

41. The method of claim 40 wherein filtering comprises low pass filtering.

42. The method of claim 41 wherein for discriminating the frequency variations in the input optical signal, the method further comprising stabilizing the asymmetrical interferometer at an operating point.

43. The method of claim 42 wherein the asymmetrical interferometer is an asymmetrical Mach-Zehnder interferometer (AMZI) and the intermediate optical signal consists of a first and second AMZI output signals.

44. An optical frequency demodulator for selectively demodulating a first information stream from an input optical signal containing the first information stream and a second information stream, the input optical signal being characterized by frequency variations which are representative of the first information stream and intensity variations which are representative of the second information stream, the optical frequency demodulator comprising:

a asymmetrical interferometer operable to discriminate the frequency variations in the input optical signal to produce an intermediate optical signal;

a photo-detector operable to convert the intermediate optical signal to an electrical signal representative of the first information stream; and a filter operable to filter the electrical signal to approximate the first information stream.

45. The optical frequency demodulator of claim 44 wherein the asymmetrical interferometer is an asymmetrical Mach-Zehnder interferometer (AMZI) with a cyclical frequency response.

46. The optical frequency demodulator of claim 45 wherein the AMZI comprises:

an optical splitter connected to receive the input optical signal and operable to divide the input optical signal received between two unbalanced paths for producing two unbalanced path signals;

an optical coupler operable to combine the unbalanced path signals for producing the intermediate optical signal in the form of a first and second AMZI output signals.

47. The optical frequency demodulator of claim 46 wherein the unbalanced paths have a path unbalance optical delay selected such that the frequency variations lie within half a cycle of the AMZI frequency response.

48. The optical frequency demodulator of claim 47 wherein to discriminate the frequency variations in the input optical signal, the AMZI is thermally stabilized to an operating point.

49. An optical frequency demodulator for selectively demodulating a first information stream from an input optical signal containing the first information stream and second information stream, the input optical signal being characterized by frequency variations in a first frequency band which are representative of the first information stream and intensity variations in a second frequency band which are representative of the second information stream, the optical frequency demodulator comprising:

interferometry means for discriminating the frequency variations in the first frequency band from the input optical signal to produce an intermediate optical signal;

photo-detecting means for converting the intermediate optical signal to an electrical signal representative of the first information stream; and filtering means for filtering the electrical signal to approximate the first information stream.

50. The optical frequency demodulator of claim 49 wherein for discriminating the frequency variations in the input optical signal, the interferometry means are thermally stabilized to an operating point.

51. An optical frequency demodulator for selectively demodulating a first information stream from an input optical signal containing the first information stream and a second information stream, the input optical signal being characterized by frequency variations in a first frequency band which are representative of the first information stream and frequency variations in a second frequency band which are representative of the second information stream, the optical frequency demodulator comprising:

interferometry means for introducing a plurality of interference ripples in the second frequency band of the input optical signal spectrum and discriminate the frequency variations in the first frequency band from the input optical signal to produce an intermediate optical signal;

photo-detecting means for converting the intermediate optical signal to an electrical signal representative of the first information stream; and filtering means for filtering the electrical signal to approximate the first information stream.

52. The optical frequency demodulator of claim 51 wherein or discriminating the frequency variations in the first frequency band from the input optical signal, the interferometry means are thermally stabilized to an operating point.

* * * * *

UNITED STATES PATENT AND TRADEMARK OFFICE
CERTIFICATE OF CORRECTION

PATENT NO.   : 6,271,959 B1  
DATED        : August 7, 2001  
INVENTOR(S)  : Kihong Kim et al.

It is certified that error appears in the above-identified patent and that said Letters Patent is hereby corrected as shown below:

Column 16,  
Line 26, change "de" to -- delay --  
Line 53, change "control-signal" to -- control signal --

Column 17,  
Line 10, change "thermoelectric" to -- thermo-electric --

Signed and Sealed this

Twenty-seventh Day of August, 2002

Attest:

Attesting Officer

JAMES E. ROGAN  
Director of the United States Patent and Trademark Office